(12) United States Patent
Wang et al.

(10) Patent No.: US 7,839,149 B2
(45) Date of Patent: *Nov. 23, 2010

(54) MULTI-COMPONENT RESISTIVITY LOGGING TOOL WITH MULTIPLE ANTENNAS USING COMMON ANTENNA GROOVES

(75) Inventors: Tsili Wang, Katy, TX (US); John A. Signorelli, Cypress, TX (US); Sheng Fang, Houston, TX (US); Roland E. Chemali, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/350,099

(22) Filed: Jan. 7, 2009

(65) Prior Publication Data

US 2009/0179647 A1 Jul. 16, 2009

Related U.S. Application Data

(60) Provisional application No. 61/020,637, filed on Jan. 11, 2008.

(51) Int. Cl.
*G01V 3/10* (2006.01)
(52) U.S. Cl. ...................... 324/343; 324/339
(58) Field of Classification Search .......... 324/338–343
See application file for complete search history.

(56) References Cited

U.S. PATENT DOCUMENTS

| | | | |
|---|---|---|---|
| 4,837,517 A | 6/1989 | Barber | |
| 5,138,263 A | 8/1992 | Towle | |
| 5,157,605 A | 10/1992 | Chandler et al. | |
| 5,452,761 A | 9/1995 | Beard et al. | |
| 5,809,433 A | 9/1998 | Thompson et al. | |
| 5,999,883 A | 12/1999 | Gupta et al. | |
| 6,566,881 B2 | 5/2003 | Omeragic | |
| 6,577,129 B1 | 6/2003 | Thompson et al. | |
| 7,057,392 B2 | 6/2006 | Wang et al. | |
| 7,268,556 B2 | 9/2007 | Fanini et al. | |
| 7,414,407 B2 | 8/2008 | Wang et al. | |
| 2004/0017197 A1* | 1/2004 | Chen et al. | 324/339 |
| 2006/0043973 A1 | 3/2006 | Chen et al. | |
| 2006/0186888 A1 | 8/2006 | Wang et al. | |

FOREIGN PATENT DOCUMENTS

| | | |
|---|---|---|
| EP | 0516525 A1 | 12/1992 |
| WO | WO2007109405 A2 | 9/2007 |

* cited by examiner

*Primary Examiner*—Jay M Patidar
(74) *Attorney, Agent, or Firm*—Mossman Kumar & Tyler PC (57) ABSTRACT

The disclosure provides a resistivity tool for use in a wellbore, wherein at least two orthogonal antennas are located at the same or substantially the same location of the tool. A single set of vertically aligned grooves is provided for the at least two orthogonal antennas. Each antenna may be configured to operate as a transmitter or receiver. A tool with collocated antennas may be used to provide azimuthally sensitive measurements even if the tool is non-rotating.

14 Claims, 9 Drawing Sheets

MULTI-COMPONENT RESISTIVITY LOGGING TOOL WITH MULTIPLE ANTENNAS USING COMMON ANTENNA GROOVES

CROSS-REFERENCES TO RELATED APPLICATIONS

This application claims priority from U.S. Provisional Patent Application Ser. No. 61/020,637 filed on Jan. 11, 2008.

BACKGROUND OF THE DISCLOSURE

1. Field of the Disclosure

The disclosure is related generally to the field of electrical resistivity well logging methods. More specifically, the disclosure is related to a method and apparatus for providing collocated coils and measuring cross-component magnetic fields in a downhole resistivity tool.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

The physical principles of electromagnetic induction resistivity well logging are well known. Many modifications and improvements can be found, for example, in U.S. Pat. Nos. 4,837,517; 5,157,605 issued to Chandler et al.; and U.S. Pat. No. 5,452,761 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art. These eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however are those layers which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 5,999,883 issued to Gupta et al., (the "Gupta patent"), the contents of which are fully incorporated here by reference, discloses a method for determining the horizontal and vertical conductivity of anisotropic earth formations. Measurements are made of electromagnetic induction signals induced by induction transmitters oriented along three mutually orthogonal axes. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to the direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

A multi-component resistivity provides information for locating bed directions, determining distances to beds, resolving resistivity anisotropy, and characterizing three-dimensional geological features. In prior art MWD tools, antennas are of some type of grooves cut on the outer surface of a tool body or drill pipe/collar. See, for example, U.S. Pat. No. 5,138,263 to Towle, U.S. Pat. No. 6,577,129 to Thompson et al., U.S. Pat. No. 7,268,556 to Fanini et al., and U.S. Pat. No. 7,057,392 to Wang et al. One technological challenge for a multi-component MWD resistivity tool is the construction of multiple antennas pointing to multiple directions. It is even more difficult to place multiple antennas compactly on a tool string. U.S. patent application Ser. No. 11/858,717 of Signorelli having the same assignee as the present disclosure and the contents of which are incorporated herein by reference teaches the use of collocated antennas for multi-component resistivity tools. The disclosure in Signorelli specifies different grooves for each component. Such an arrangement may be perfectly satisfactory for wireline applications, but for MWD applications, having a large number of grooves would weaken the drill collar. The present disclosure describes multiple multidirection collocated antennas with a vastly reduced number of grooves.

SUMMARY OF THE DISCLOSURE

One embodiment of the disclosure is an apparatus for use in a borehole. The apparatus includes a longitudinal tool member, a first antenna having a first orientation and a second antenna having a second orientation, the first antenna and the second antenna being positioned at a substantially common location of the tool member, at least one pair of longitudinal slots in the tool member, a high permeability magnetic material placed in the at least one pair of longitudinal slots, and a first conductor and a second conductor over the at least one pair of longitudinal slots configured to define the first antenna and a second antenna. The first orientation and the second orientation may correspond to (i) a longitudinal tool axis and a transverse tool axis, or (ii) a first transverse axis of the tool and a second transverse axis of the tool, or (iii) a first direction and a second direction non-orthogonal to the first direction. The apparatus may further include a third antenna having an orientation wherein the third orientation is at an angle relative to the first orientation and a second orientation, or substantially orthogonal to the first orientation and the second orientation. The common location may be common relative to a longitudinal axis and a center in a transverse plane of the tool member. The tool member may be a drill collar of a drilling assembly, a metallic sleeve mounted on a portion of the drill collar of a drilling assembly, or a housing of a wireline resistivity tool. The first antenna and a second antenna may be part of a transmitter that is configured to transmit electromagnetic radiation signals into an earth formation surrounding the borehole, or a receiver configured to receive electromagnetic radiation signals from an earth formation. The first antenna and a second antenna may be part of a receiver configured to receive electromagnetic radiation signals from an earth formation, and the apparatus may further include at least one processor configured to process the signals received by at least one of the first antenna and a second antenna, and to provide an estimate of the property of interest. The property of interest may be an electrical property of the formation, an electrical property of the fluid downhole, and/or a distance to an approaching bed boundary relative to an element of the apparatus. The high permeability magnetic material may be a soft ferrite material, an electrically conductive soft amorphous magnetic alloy, an electrically conductive nanocrystaline soft magnetic alloy, a stack made of soft amorphous magnetic alloy, a stack made of a nanocrystalline soft magnetic alloy, a soft iron powder containing at least one of an organic and an inorganic binder, a sendust containing at least one of an organic and an inorganic binder, and/or a nickel iron alloy powder containing at least one of an organic and an inorganic binder. The at least one processor may be further configured to control a direction of drilling using the estimate of the property of interest.

Another embodiment of the disclosure is a method of estimating a property of interest using a downhole tool. The method includes transmitting electromagnetic radiation into an earth formation and receiving electromagnetic signals from the formation responsive to the transmitted electromagnetic radiation, wherein receiving the electromagnetic signals is carried out by a first antenna collocated with a second antenna on the downhole tool, the first and second antennas including a first conductor and a second conductor respectively disposed over at least one pair of longitudinal slots on the downhole tool. The method may further include processing the received electromagnetic signals to estimate the property of interest and recording the estimated property of interest on a suitable medium. The property of interest may be an electrical property of the formation, an electrical property of a fluid downhole, and/or a distance to an approaching bed relative an element of the apparatus. The method may further include controlling a directional drilling using the estimate of the property of interest.

Another embodiment of the disclosure is an apparatus for use in a borehole. The apparatus includes a substantially non-rotating longitudinal tool member, a transmitter on the tool member configured to radiate an electromagnetic signal into an earth formation, a first antenna having a first orientation configured to produce a first signal resulting from interaction of the electromagnetic signal for the earth formation, a second antenna having a second orientation configured to produce a second signal resulting from interaction of the electromagnetic signal with the earth formation, the first antenna and the second antenna being positioned at substantially a common location of the tool member, and a processor configured to use the first measurement, the second measurement, a measurement of the first orientation, a measurement of the second orientation, and a measurement of an orientation of the tool member to estimate a value of a signal that would result from interaction of the EM signal with the earth formation at an arbitrary orientation of the tool member. At least one of first antenna and the second antenna include at least one slot in the tool member, a high magnetic permeability material placed in the at least one slot, and an electrical conductor over the slot to form a loop antenna. The first antenna and a second antenna may include at least one pair of longitudinal slots in the tool member, a high magnetic permeability material placed in the at least one pair of longitudinal slots, and an electrical conductor over the at least one pair of longitudinal slots to form a loop antenna.

Another embodiment of the disclosure is a method of estimating a property of interest using a downhole tool. The method includes transmitting electromagnetic radiation from a transmitter on a substantially non-rotating longitudinal tool member, using a first antenna having a first orientation to produce a first signal resulting from interaction of the electromagnetic signal with the earth formation, using a second antenna having a second orientation configured to produce a second signal resulting from interaction of the EM signal with the earth formation, the first antenna and second antenna being positioned at substantially a common location of the tool member; using the first measurement, the second measurement, a measurement of the first orientation, a measurement of the second orientation, and a measurement of an orientation of the tool member to estimate a value of a signal that would result from interaction of the EM signal with the earth formation at a plurality of orientations of the tool member; and using the estimated value of the signals at the plurality of orientations to estimate a value of a resistivity property of the earth formation. The method may further include providing, for at least one of the first antenna and a second antenna, at least one slot in the tool member, a high magnetic permeability material placed in the at least one slot, and an electrical conductor over the slot to form a loop antenna. The method may include providing for the first antenna and a second antenna at least one pair of longitudinal slots in the tool member, a high magnetic permeability material placed in the at least one pair of slots, and an electrical conductor over the at least one pair of slots to form a loop antenna.

BRIEF DESCRIPTION OF THE DRAWINGS

The present disclosure is best understood with reference to the accompanying figures in which like numerals refer to like elements, and in which.

DETAILED DESCRIPTION OF THE DISCLOSURE

Figure 1:
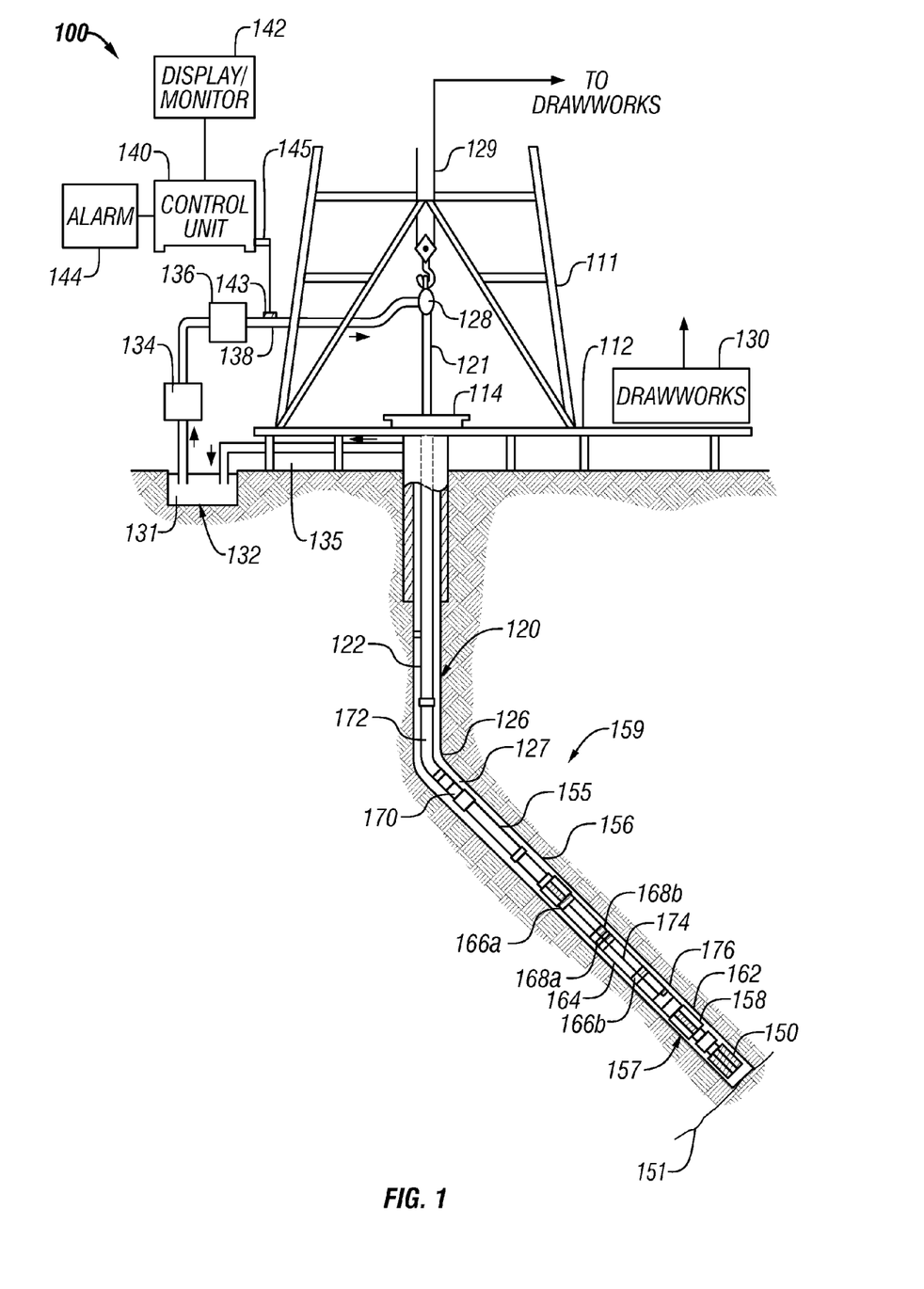
FIG. 1 is an illustration of a drilling assembly suitable for use with the present disclosure.

FIG. 1 shows a schematic diagram of a drilling system 110 having a downhole assembly containing an acoustic sensor system and the surface devices according to one embodiment of present disclosure. As shown, the system 110 includes a conventional derrick 111 erected on a derrick floor 112 which supports a rotary table 114 that is rotated by a prime mover (not shown) at a desired rotational speed. A drill string 120 that includes a drill pipe section 122 extends downward from the rotary table 114 into a borehole 126. A drill bit 150 attached to the drill string downhole end disintegrates the geological formations when it is rotated. The drill string 120 is coupled to a drawworks 130 via a kelly joint 121, swivel 118 and line 129 through a system of pulleys 127. During the drilling operations, the drawworks 130 is operated to control the weight on bit and the rate of penetration of the drill string 120 into the borehole 126. The operation of the drawworks is well known in the art and is thus not described in detail herein. During drilling operations a suitable drilling fluid (commonly referred to in the art as "mud") 131 from a mud pit 132 is circulated under pressure through the drill string 120 by a mud pump 134. The drilling fluid 131 passes from the mud pump 134 into the drill string 120 via a desurger 136, fluid line 138 and the kelly joint 121. The drilling fluid is discharged at the borehole bottom 151 through an opening in the drill bit 150. The drilling fluid circulates uphole through the annular space 127 between the drill string 120 and the borehole 126 and is discharged into the mud pit 132 via a return line 135. A variety of sensors (not shown) are appropriately deployed on the surface according to known methods in the art to provide information about various drilling-related parameters, such as fluid flow rate, weight on bit, hook load, etc.

A surface control unit 140 receives signals from the downhole sensors and devices via a sensor 143 placed in the fluid line 138 and processes such signals according to programmed instructions provided to the surface control unit. The surface control unit displays desired drilling parameters and other information on a display/monitor 142 which information is utilized by an operator to control the drilling operations. The surface control unit 140 contains a computer, memory for storing data, data recorder and other peripherals. The surface control unit 140 also includes models and processes data according to programmed instructions and responds to user commands entered through a suitable means, such as a keyboard. The control unit 140 is may be adapted to activate alarms 144 when certain unsafe or undesirable operating conditions occur.

A drill motor or mud motor 155 coupled to the drill bit 150 via a drive shaft (not shown) disposed in a bearing assembly 157 rotates the drill bit 150 when the drilling fluid 131 is passed through the mud motor 155 under pressure. The bearing assembly 157 supports the radial and axial forces of the drill bit, the downthrust of the drill motor and the reactive upward loading from the applied weight on bit. A stabilizer 158 coupled to the bearing assembly 157 acts as a centralizer for the lowermost portion of the mud motor assembly. The use of a motor is for illustrative purposes and is not a limitation to the scope of the disclosure.

In one embodiment of the system of present disclosure, the downhole subassembly 159 (also referred to as the bottom-hole assembly or "BHA") which contains the various sensors and MWD devices to provide information about the formation and downhole drilling parameters and the mud motor, is coupled between the drill bit 150 and the drill pipe 122. The downhole assembly 159 may be modular in construction, in that the various devices are interconnected sections so that the individual sections may be replaced when desired.

Still referring to FIG. 1, the BHA may also contain sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 164 may be coupled above the lower kick-off subassembly 162 that provides signals, from which resistivity of the formation near the drill bit 150 is determined. A multiple propagation resistivity device ("MPR") having one or more pairs of transmitting antennae 166a and 166b spaced from one or more pairs of receiving antennae 168a and 168b is used. Magnetic dipoles are employed which operate in the medium frequency and lower high frequency spectrum. In operation, the transmitted electromagnetic waves are perturbed as they propagate through the formation surrounding the resistivity device 164. The receiving antennae 168a and 168b detect the perturbed waves. Formation resistivity is derived from the phase and amplitude of the detected signals. The detected signals are processed by a downhole circuit or processor that is may be placed in a housing 170 above the mud motor 155 and transmitted to the surface control unit 140 using a suitable telemetry system 172. In addition to or instead of the propagation resistivity device, a suitable induction logging device may be used to measure formation resistivity.

The inclinometer 174 and gamma ray device 176 are suitably placed along the resistivity measuring device 164 for respectively determining the inclination of the portion of the drill string near the drill bit 150 and the formation gamma ray intensity. Any suitable inclinometer and gamma ray device, however, may be utilized for the purposes of this disclosure. In addition, an azimuth device (not shown), such as a magnetometer or a gyroscopic device, may be utilized to determine the drill string azimuth. Such devices are known in the art and are, thus, not described in detail herein. In the above-described configuration, the mud motor 155 transfers power to the drill bit 150 via one or more hollow shafts that run through the resistivity measuring device 164. The hollow shaft enables the drilling fluid to pass from the mud motor 155 to the drill bit 150. In an alternate embodiment of the drill string 120, the mud motor 155 may be coupled below resistivity measuring device 164 or at any other suitable place.

The drill string contains a modular sensor assembly, a motor assembly and kick-off subs. In one embodiment, the sensor assembly includes a resistivity device, gamma ray device and inclinometer, all of which are in a common housing between the drill bit and the mud motor. The downhole assembly of the present disclosure may include a MWD section 168 which contains a nuclear formation porosity measuring device, a nuclear density device, an acoustic sensor system placed, and a formation testing system above the mud motor 164 in the housing 178 for providing information useful for evaluating and testing subsurface formations along borehole 126. A downhole processor may be used for processing the data.

Figure 2:
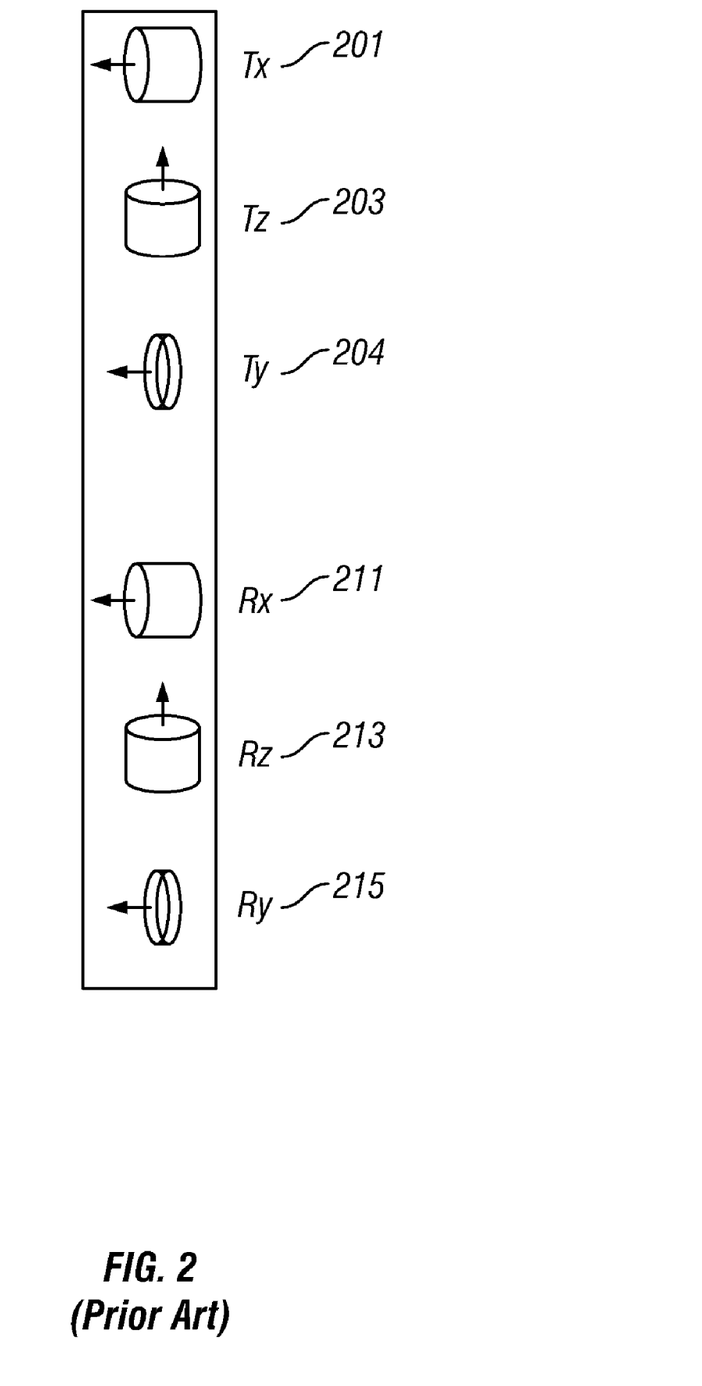
FIG. 2 (prior art) shows the transmitter and receiver configuration of a prior art multi-component logging tool.

FIG. 2 shows the configuration of transmitter coils and receiver coils in an embodiment of the 3Dexplorer (3DEX®) induction logging instrument of Baker Hughes Incorporated. Three transmitters 201, 203, and 205 that are referred to as the $T_x$, $T_z$, and $T_y$ transmitters are placed with their normals substantially orthogonal to each other, in the order shown. The three transmitters induce magnetic fields in three spatial directions. The subscripts (x, y, z) indicate an orthogonal system substantially defined by the directions of the normals to the transmitters. The z-axis is chosen to be substantially parallel to the longitudinal axis of the tool, while the x-axis and y-axis are mutually perpendicular directions lying in the plane transverse to the longitudinal axis. Also on the tool are receivers 207, 209, and 211, referred to as the $R_x$, $R_z$, and $R_y$ receivers, aligned along the orthogonal system defined by the transmitter normals. $R_x$, $R_z$, and $R_y$ are responsible for measuring the corresponding magnetic fields $H_{xx}$, $H_{zz}$, and $H_{yy}$. In this nominalization of the magnetic fields, the first index indicates the direction of the transmitter and the second index indicates the direction of the receiver.

Figure 3:
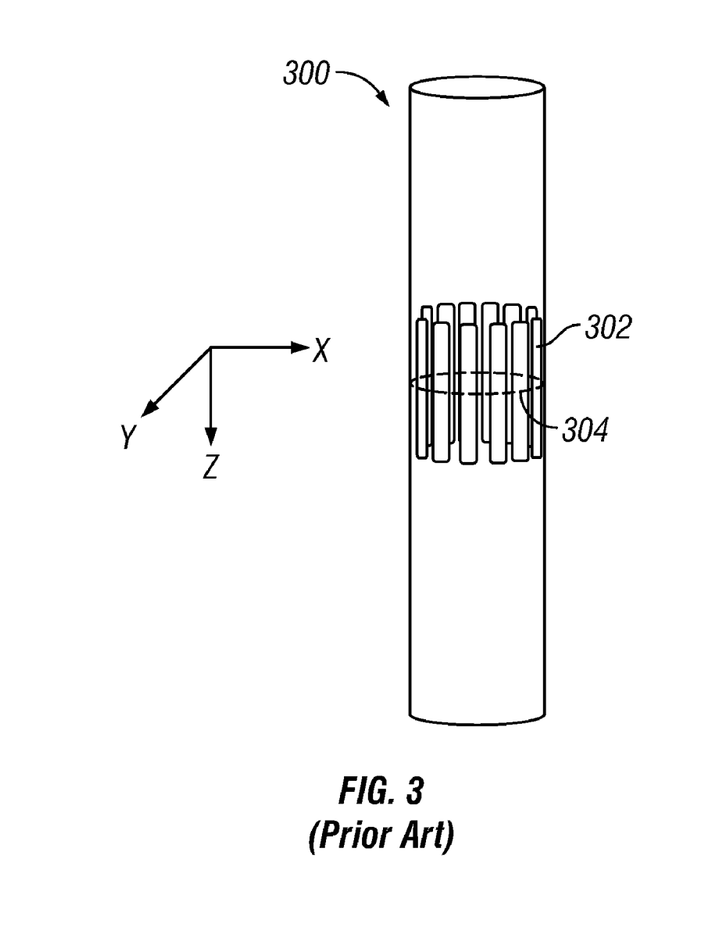
FIG. 3 (prior art) shows a conventional antenna with a z-coil and vertical grooves.

Turning now to FIG. 3, a prior art antenna arrangement for a z-coil is illustrated. In the drill collar 300, there are a plurality of vertical grooves 302. The z-coil 304 is positioned in the drill collar orthogonally to the grooves as shown. Ferrite inserts (not shown) may be provided in each of the grooves between the conducting antenna wire and the drill collar. The ferrite provides a magnetostatic shield between the antenna wires and the drill collar and serves to reduce induced currents in the drill collar. Note that the antenna arrangement shown in this figure and in the rest of the figures could be used for either a transmitter or a receiver; any exceptions will be noted.

Figure 4:
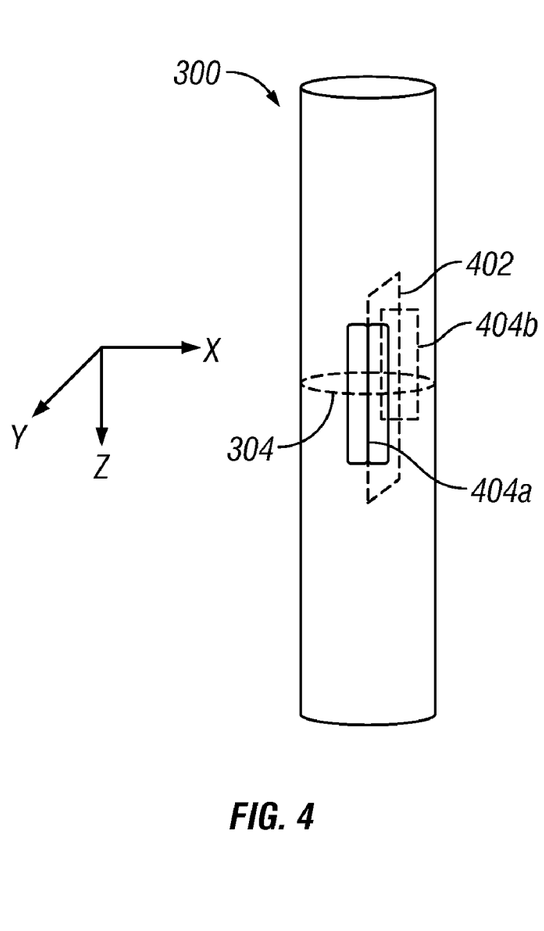
FIG. 4 shows an antenna arrangement with z- and x-coils and two rectangular grooves.
Figure 5:
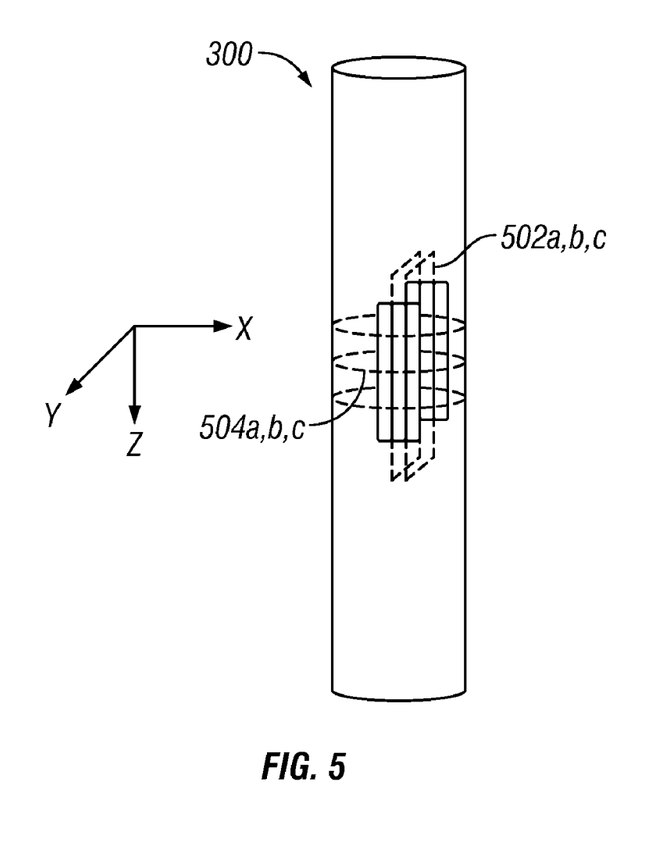
FIG. 5 shows an antenna arrangement with multiple turns z- and x-coils and two rectangular grooves.

FIG. 4 shows an arrangement in which an x-coil 402 is positioned orthogonal to the z-coil. While this is a convenient arrangement, it is not to be construed as a limitation. At least two grooves 404a, 404b may be used and positioned on opposite sides of the drill collar. The shape of the grooves may be square, rectangular, elliptical and circular. A high magnetic permeability material may be placed in some or all of the grooves. The high magnetic permeability material may be a soft ferrite material; an electrically conductive soft amorphous magnetic alloy, an electrically conductive nanocrystaline soft magnetic alloy, a stack made of soft amorphous magnetic alloy, a stack made of a nanocrystaline soft magnetic alloy, a soft iron powder containing at least one of an organic and an inorganic binder, a sendust containing at least one of an organic and an inorganic binder, and/or a nickel iron alloy powder containing at least one of an organic and an inorganic binder. FIG. 5 shows a variation of the arrangement of FIG. 4 wherein the z-coil comprises multiple turns 504a, 504b, 504c and the x-coil comprises multiple turns 502a, 502b, 502c. The purpose of the multiple turns is to increase the signal level. The centers of the z- and x-coils are collocated at the same longitudinal position of the tool and the same location in a transverse plane of the tool member.

Figure 6:
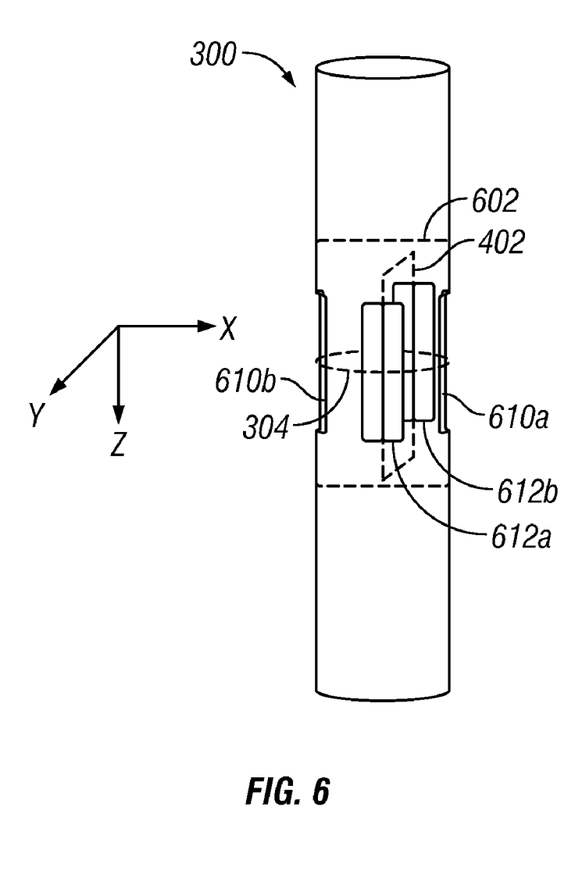
FIG. 6 shows an antenna arrangement with z-, x- and y-coils and four rectangular grooves.
Figure 7:
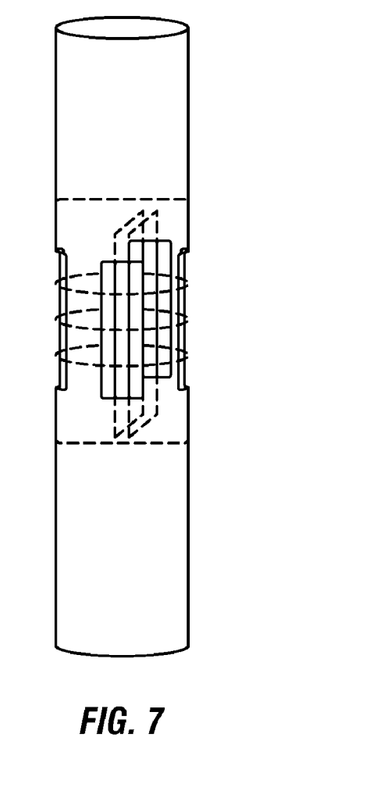
FIG. 7 shows an antenna arrangement with multiple z-, x- and y-coils and four rectangular grooves.

Turning now to FIG. 6, and arrangement of co-located z-, x- and y-coils (304, 402, 602) is shown. Also shown are pairs of rectangular grooves (610a, 610b) and (612a, 612b). As in the embodiments discussed above, ferrite may be provided between the antenna wire and the body of the drill collar. A variant of FIG. 6 is illustrated in FIG. 7 where the z-, x- and y-coils each have multiple turns.

A common feature of all the embodiments discussed above is that a single set of grooves is used for more than one antenna component. This is in contrast to prior art methods, such as those discussed in U.S. Pat. No. 7,057,392 to Wang et al., having the same assignee as the present disclosure and the contents of which are incorporated herein by reference, where each set of grooves is used for only one antenna component. Thus, with the present designs, the antennas for the different components can be collocated.

One of the advantages of having such an arrangement is that the tool can be shorter. Other advantageous would become clear from the discussions below.

Figure 8:
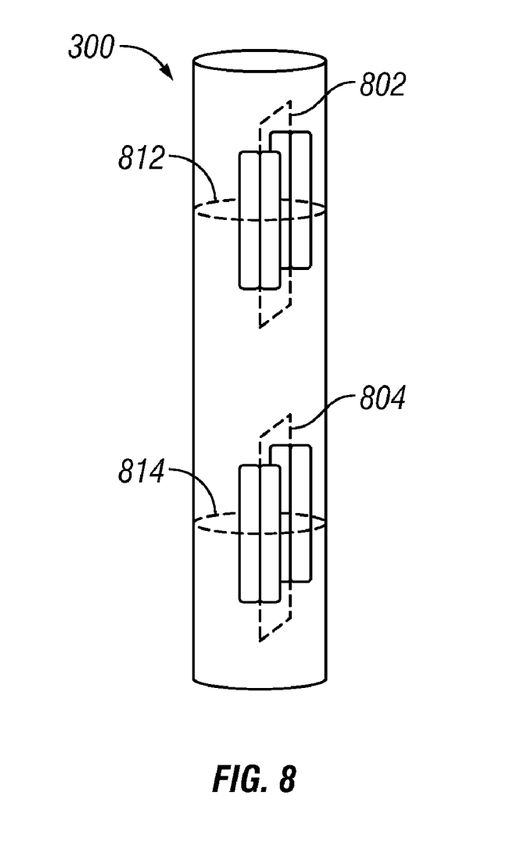
FIG. 8 shows a tool having a transmitter antenna arrangement with z-, and x-coils and four rectangular grooves spaced apart from a receiver antenna arrangement with z-, and x-coils and four rectangular grooves.

FIG. 8 shows a transmitter antenna arrangement comprising a z-transmitter 812 and an x-transmitter 802 spaced apart from a receiver an antenna arrangement comprising a z-receiver 814 and an x-receiver 804. It will be clear that the transmitter-receiver distance for the zx and zz components will be equal. The same is true of the xz and xx components. This is in contrast to the prior art arrangement of FIG. 2 where the same transmitter receiver distances are not equal. The present design therefore would not require any correction for differences in transmitter-receiver distance.

Figure 9:
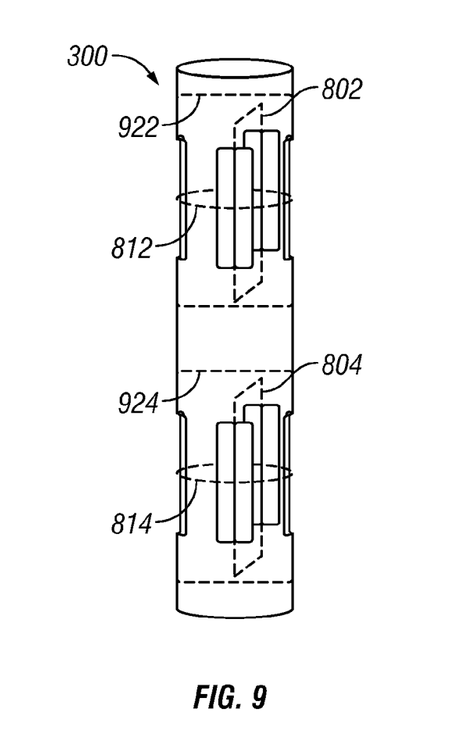
FIG. 9 shows a tool having a transmitter antenna arrangement with z-, x- and y-coils and four rectangular grooves spaced apart from a receiver antenna arrangement with z-, x- and y-coils and four rectangular grooves.

This advantage is also clear in FIG. 9 where the transmitter antenna arrangement includes, in addition to the z- and x-antennas, a y-oriented antenna 922, and the receiver antenna arrangement includes, in addition to the z- and x-antennas, a y-oriented antenna 924. Again, it will be clear that with the logging tool of FIG. 9, all nine components of the magnetic field can be measured at the same transmitter-receiver distance. This is not the case with the prior art arrangement of FIG. 2. It should be noted that the examples given above show orthogonal coil orientations. This is not to be construed as a limitation as data acquired with two or more coils inclined to each other may be processed using well known Cartesian rotation methods to simulate measurements made with orthogonal coils.

Figure 10:
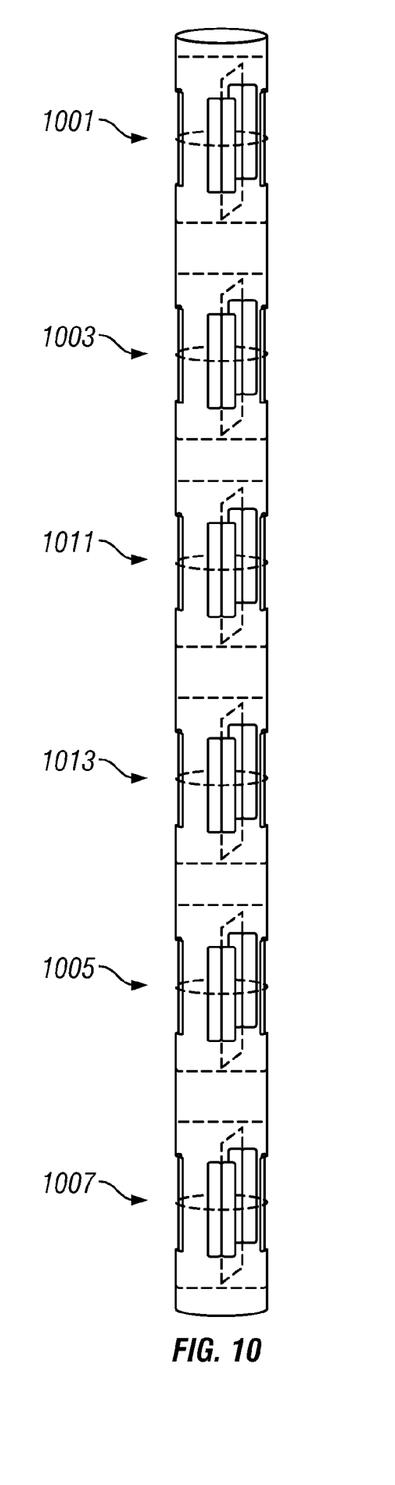
FIG. 10 shows a tool having two pairs of transmitter antenna groups symmetrically disposed about two pairs of receiver antenna groups.

FIG. 10 shows an embodiment with six groups of antennas. They include two receiver groups 1011, 1013. Two transmitter group 1001, 1003 are positioned on one side of the receiver groups and two transmitter groups 1005, 1007 are positioned on the side of the receiver groups opposite the transmitter groups 1001, 1003. Each of the antenna groups includes a z-antenna, an x-antenna and optionally, a y-antenna. The y-antenna is not essential for many MWD applications but is desirable for certain wireline applications.

Those skilled in the art and having benefit of the present disclosure would recognize that the axial length of the arrangement of FIG. 10 is about the same as the axial length of the arrangement of FIG. 2. Collocating antennas, besides reducing the length of the resistivity tool and thus the BHA 90, also means that depth interpolation is not needed. Additionally, with the arrangement of FIG. 10, much more sophisticated processing may be carried out. This includes resistivity determination from amplitude differences of signals at the two receivers as well as resistivity determination from phase differences of signals at the two receivers. In addition, from the principle of reciprocity, resistivity determinations may be made at the transmitter locations using amplitude and phase differences of signals received at a common receiver. In addition, measurements made by two receivers can be combined based on their distances from a transmitter: this is described in U.S. patent application Ser. No. 11/489,875 of Wang et al., having the same assignee as the present disclosure and the contents of which are incorporated herein by difference.

Those versed in the art and having benefit of the present disclosure would also recognize that any of the embodiments described above may be used for determination of formation resistivity, formation anisotropy, distance to a bed boundary and/or reservoir navigation using methods known in the art.

U.S. Pat. No. 7,414,407 to Wang et al., the contents of which are incorporated herein by reference, discloses a MWD or LWD method and apparatus for determining the azimuth of a remote formation layer in the vicinity of a downhole resistivity tool. A cross-component magnetic field with substantially orthogonal transmitter and receiver coils is provided. The coil planes are either substantially orthogonal (coaxial coils) or parallel (transverse coils) with respect to, the longitudinal axis of the tool body. The coils are placed on the tool body having a external surface and a plurality of grooves are cut in the external surface of the tool body and oriented substantially horizontally with respect to the longitudinal axis of the tool body for the coils and oriented vertically with respect to the longitudinal axis of the tool body for the coaxial coils. A transverse coil and a coaxial coil are placed in the grooves for transmission or reception of a cross-component transverse magnetic field. High magnetic permeability materials may be inserted in the grooves in between the coil wire and the bottom of the grooves. Multiple receivers, transmitters and frequencies may be used to obtain the maximum possible signal-to-noise ratio. The in-phase or quadrature part of a magnetic field, or a combination of the two, or alternatively, the amplitude and/or phase, of the cross-component magnetic field may be measured and processed to indicate the azimuth of a remote layer boundary, provided that the layer boundary is within the depth of investigation of the tool. Measurements may also be made at continuous or multiple tool azimuths. The present disclosure has the capability of doing substantially all that is taught in Wang, with the additional advantage of having collocated coils and a reduced set of grooves.

Figure 11:
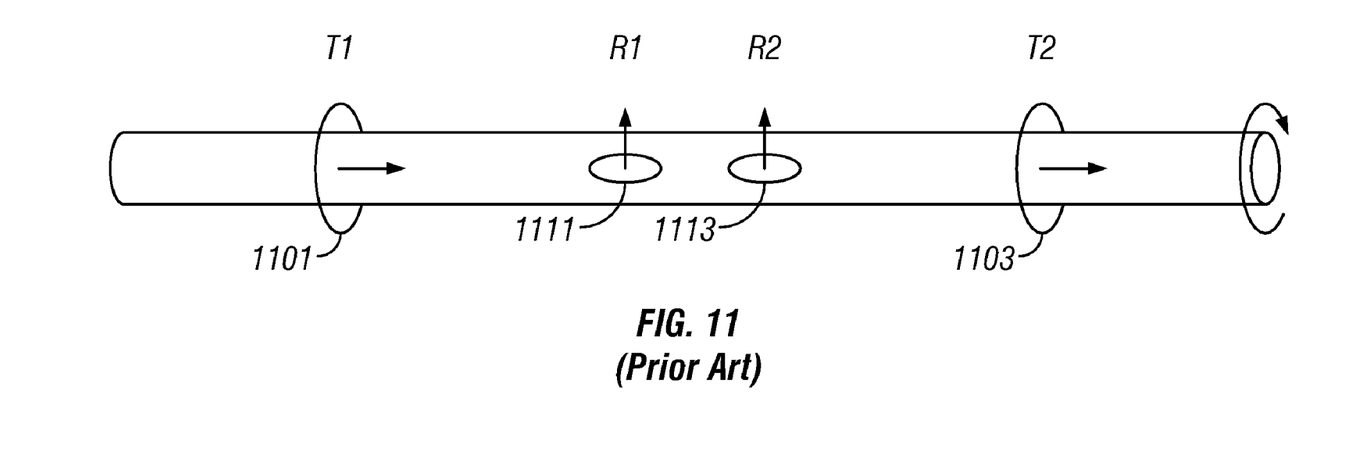
FIG. 11 (prior art) shows a logging tool with two transverse receivers and two axial receivers used for making azimuthally sensitive measurements with a rotating tool.

An exemplary coil configuration of the Wang is illustrated in FIG. 11. The tool includes two axially oriented transmitters 1101, 1103 and two transversely oriented receivers 1111, 1113. Such a tool can be used to make azimuthally sensitive resistivity measurements during rotation of the tool.

Figure 12:
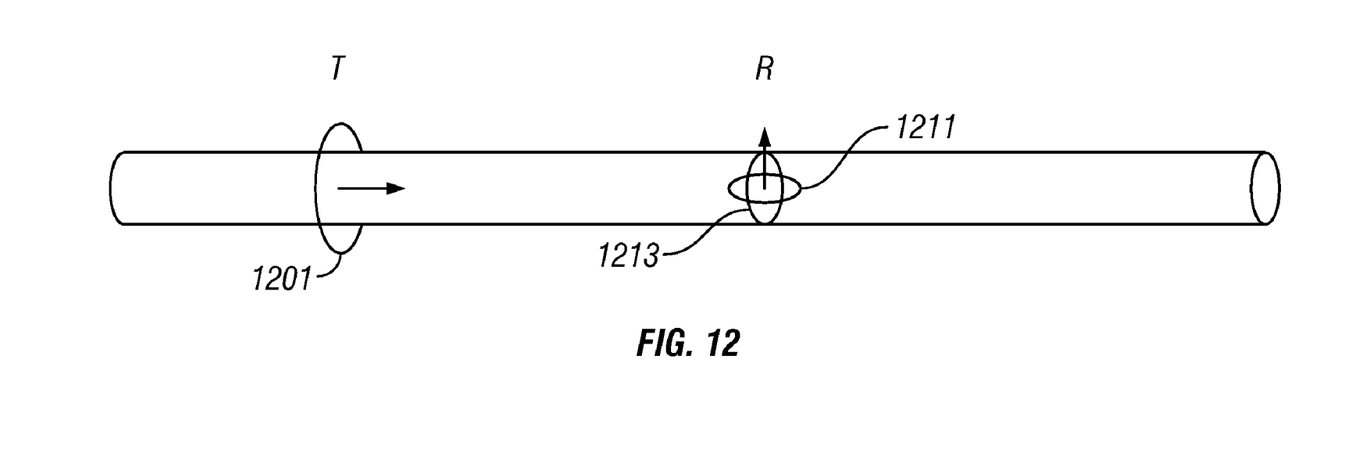
FIG. 12 shows an embodiment in which azimuthally sensitive measurements may be made without rotation of the tool.
Figure 13:
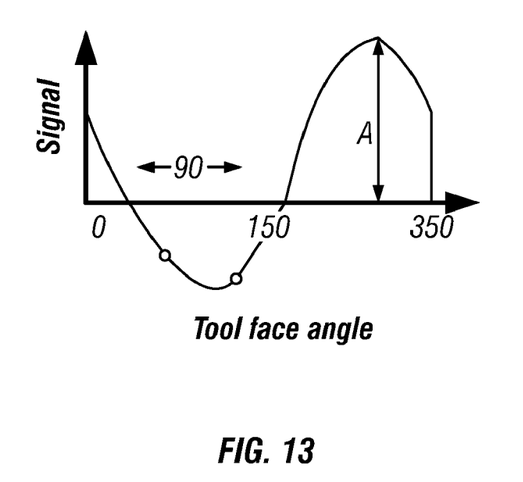
FIG. 13 shows a simulated measurement obtained using two fixed coils.

Turning now to FIG. 12, a particular combination of transmitters and receivers coils from FIG. 9 is shown that can be used to make azimuthally sensitive measurements without rotation of the tool. Specifically, from the arrangement of FIG. 9, a single z-transmitter is used along with an x-receiver and a y-receiver. These are denoted by 1201, 1211, 1213. With such a configuration, the signals measured by the two receivers can be represented by the sinusoidal functions:

$$S_1 = A \sin(\theta_1 + \theta_0)$$

$$S_2 = A \sin(\theta_2 + \theta_0) \quad (1),$$

where A is the maximum signal, $\theta_0$ is an initial phase angle of the sine wave, $\theta_1$ and $\theta_2$ are going phase angles of the two receivers, and $S_1$ and $S_2$ are the signals measured by the two receivers. The tool face angles can be measured using an orientation device such as a magnetometer. Thus, having measurements in two orthogonal receivers (or two receivers inclined to each other, it is possible to synthesize the tool response at any arbitrary rotational angle. Such a sinusoidal fit is illustrated in FIG. 13.

Figure 14:
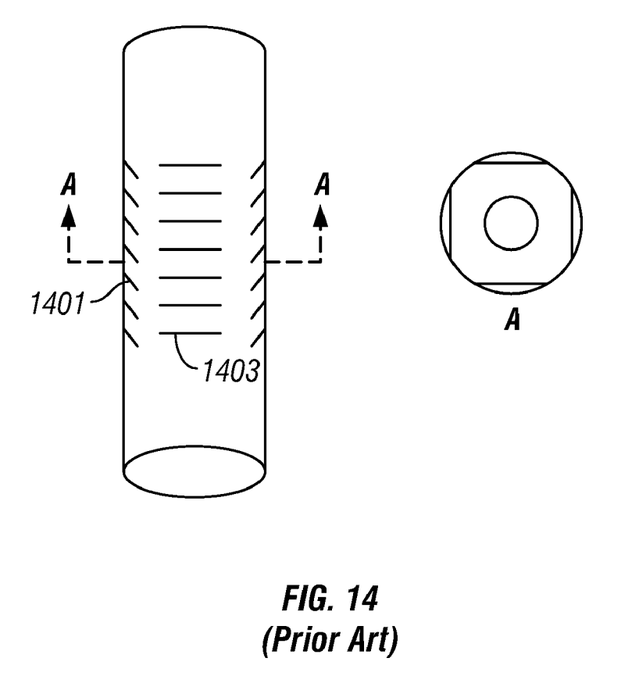
FIG. 14 (prior art) shows an alternate coil and groove arrangement for obtaining simulated measurement using two fixed coils.

While the use of collocated antennas is necessary for obtaining said simulated measurements with a nonrotating tool, prior art devices having collocated antennas may be used. This is illustrated in the example of FIG. 14. In the figure, two sets of grooves 1401, 1403 for the receiver coils are shown.

Figure 15A:
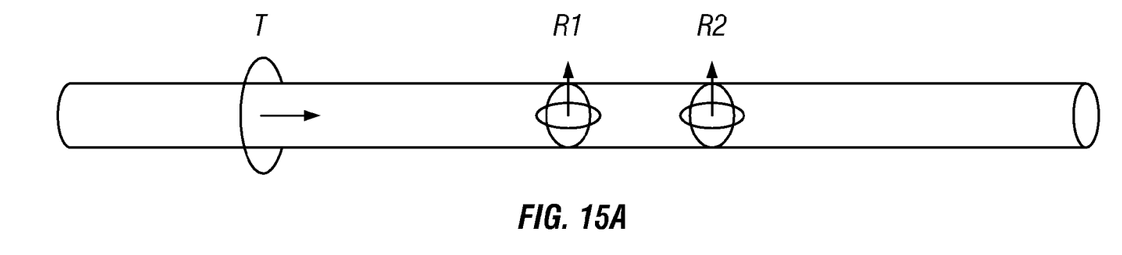
FIG. 15A-C shows other arrangements in which one of more sets of orthogonal, transverse, collocated receiver coils may be used in combination with one or more axially oriented transmitter coils.
Figure 15B:
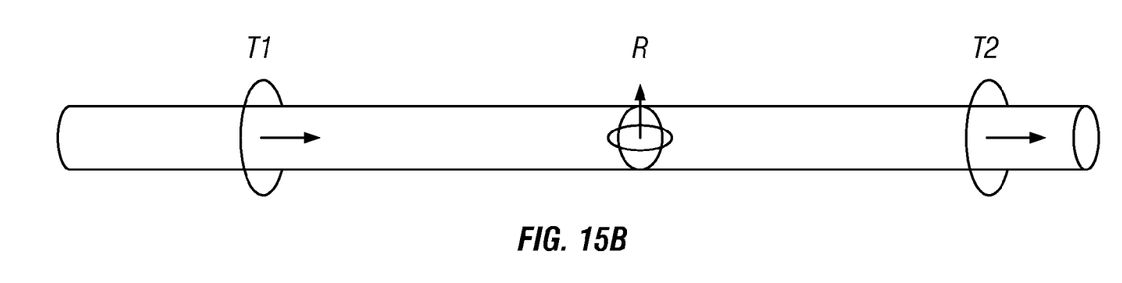
Figure 15C:
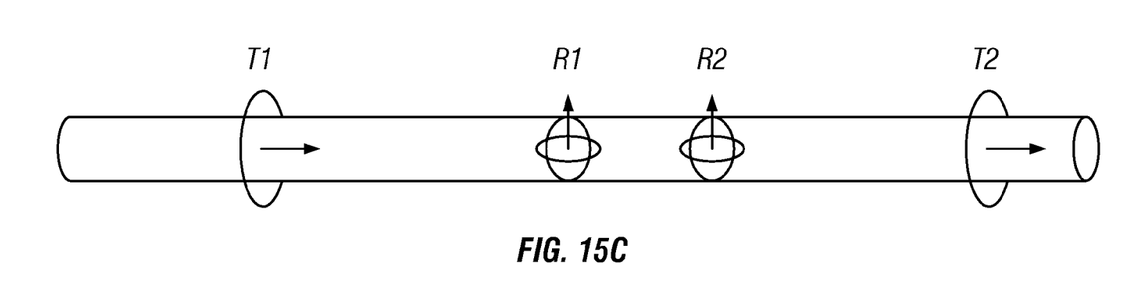

FIG. 15A-C illustrate other configurations that may be used for an azimuthally sensitive tool. In 15A, there are two pairs of transverse collocated receivers and one axial transmitter. In 15B, that is one pair of transverse collocated receivers and two axially oriented transmitters. In 15C, there two pairs of transverse collocated receivers and two axially oriented transmitters.

Any of the configurations discussed above may be used for obtaining azimuthally sensitive measurements with a nonrotating tool. This may, for example, be done with wireline logging. It may also be done when tripping out of the hole with the sensors on the BHA.

The operation of the transmitters and receivers, and the control of the drilling direction may be controlled by the downhole processor and/or a surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks. The term "processor" as used herein is intended to include Field Programmable Gate Arrays (FPGAs).

While the foregoing disclosure is directed to the specific embodiments of the disclosure, various modifications will be apparent to those skilled in the art. It is intended that all such variations within the scope of the appended claims be embraced by the foregoing disclosure.

What is claimed is:

1. An apparatus configured to evaluate an earth formation comprising:
    a longitudinal tool member;
    a first antenna on the longitudinal tool member having a first orientation;
    a second antenna on the longitudinal tool member having a second orientation different from the first orientation, the second antenna having a center at substantially the same location as a center of the first antenna;
    at least one pair of longitudinal slots in the tool member;
    a first conductor over a selected pair of the at least one pair of longitudinal slots defining the first antenna; and
    a second conductor over the selected pair of the at least one pair of longitudinal slots defining the second antenna.

2. The apparatus of claim 1 further comprising a high permeability magnetic material placed in the at least one pair of longitudinal slots.

3. The apparatus of claim 2 wherein the high permeability material is selected from: (i) a soft ferrite material, (ii) an electrically conductive soft amorphous magnetic alloy, (iii) an electrically conductive nanocrystalline soft magnetic alloy, (iv) a stack made of soft amorphous magnetic alloy, (v) a stack made of a nanocrystalline soft magnetic alloy, (vi) a soft iron powder containing at least one of an organic and an inorganic binder, (vii) a sendust containing at least one of an organic and an inorganic binder, and (viii) a nickel iron alloy powder containing at least one of an organic and an inorganic binder.

4. The apparatus of claim 1 wherein the first orientation is selected from: (i) a longitudinal tool axis of the longitudinal tool member, (ii) a transverse axis of the longitudinal tool member.

5. The apparatus of claim 1 further comprising a third antenna having a center at substantially the same location as the location of the center of the first antenna, the third antenna having an orientation substantially orthogonal to the orientation of the first antenna and the second antenna.

6. The apparatus of claim 1 wherein the tool member is selected from: (i) a drill collar of a drilling assembly, (ii) a metallic sleeve mounted on a portion of the drill collar of a drilling assembly, and (iii) a housing of a wireline resistivity tool.

7. The apparatus of claim 1 wherein the first antenna and the second antenna are selected from: (i) a transmitter antenna, and (ii) a receiver antenna.

8. The apparatus of claim 1 further comprising a processor configured to use a signal obtained by the longitudinal tool member to estimate a property of interest.

9. The apparatus of claim 8 wherein the processor is further configured to estimate a value of a property selected from: (i) an electrical property of the formation, (ii) an electrical property of the fluid downhole, and (iii) a distance to an approaching bed boundary relative to an element of the apparatus.

10. A method of evaluating an earth formation comprising:
    conveying a longitudinal tool member into a borehole, the longitudinal tool member including:
    a first antenna on having a first orientation;
    a second antenna on having a second orientation different from the first orientation, the second antenna having a center at substantially the same location as a center of the first antenna;
    at least one pair of longitudinal slots;
    a first conductor over a selected pair of the at least one pair of longitudinal slots defining the first antenna; and
    a second conductor over the selected pair of the at least one pair of longitudinal slots defining the second antenna;
    using the longitudinal tool member to obtain a signal indicative of a property of interest;
    using the signal to estimate a value of the property of interest.

11. The method of claim 10 further comprising disposing a high permeability magnetic material placed in the at least one pair of longitudinal slots.

12. The method of claim 11 further comprising using, for the high permeability material, a material is selected from: (i) a soft ferrite material, (ii) an electrically conductive soft amorphous magnetic alloy, (iii) an electrically conductive nanocrystalline soft magnetic alloy, (iv) a stack made of soft amorphous magnetic alloy, (v) a stack made of a nanocrystalline soft magnetic alloy, (vi) a soft iron powder containing at least one of an organic and an inorganic binder, (vii) a sendust containing at least one of an organic and an inorganic binder, and (viii) a nickel iron alloy powder containing at least one of an organic and an inorganic binder.

13. The method of claim 10 further comprising selecting the tool member from: (i) a drill collar of a drilling assembly, (ii) a metallic sleeve mounted on a portion of the drill collar of a drilling assembly, and (iii) a housing of a wireline resistivity tool.

14. The method of claim 11 further comprising selecting the property from: (i) an electrical property of the formation, (ii) an electrical property of the fluid downhole, and (iii) a distance to an approaching bed boundary relative to an element of the apparatus.

* * * * *